March 10, 1970 M. S. LAMPERT ET AL 3,500,396
BACKGROUND AVERAGING SYSTEM FOR IMPROVING
RADAR TARGET DETECTION
Filed Dec. 23, 1968 2 Sheets-Sheet 1

Marvin S. Lampert
Richard Q. Schmidt
INVENTORS

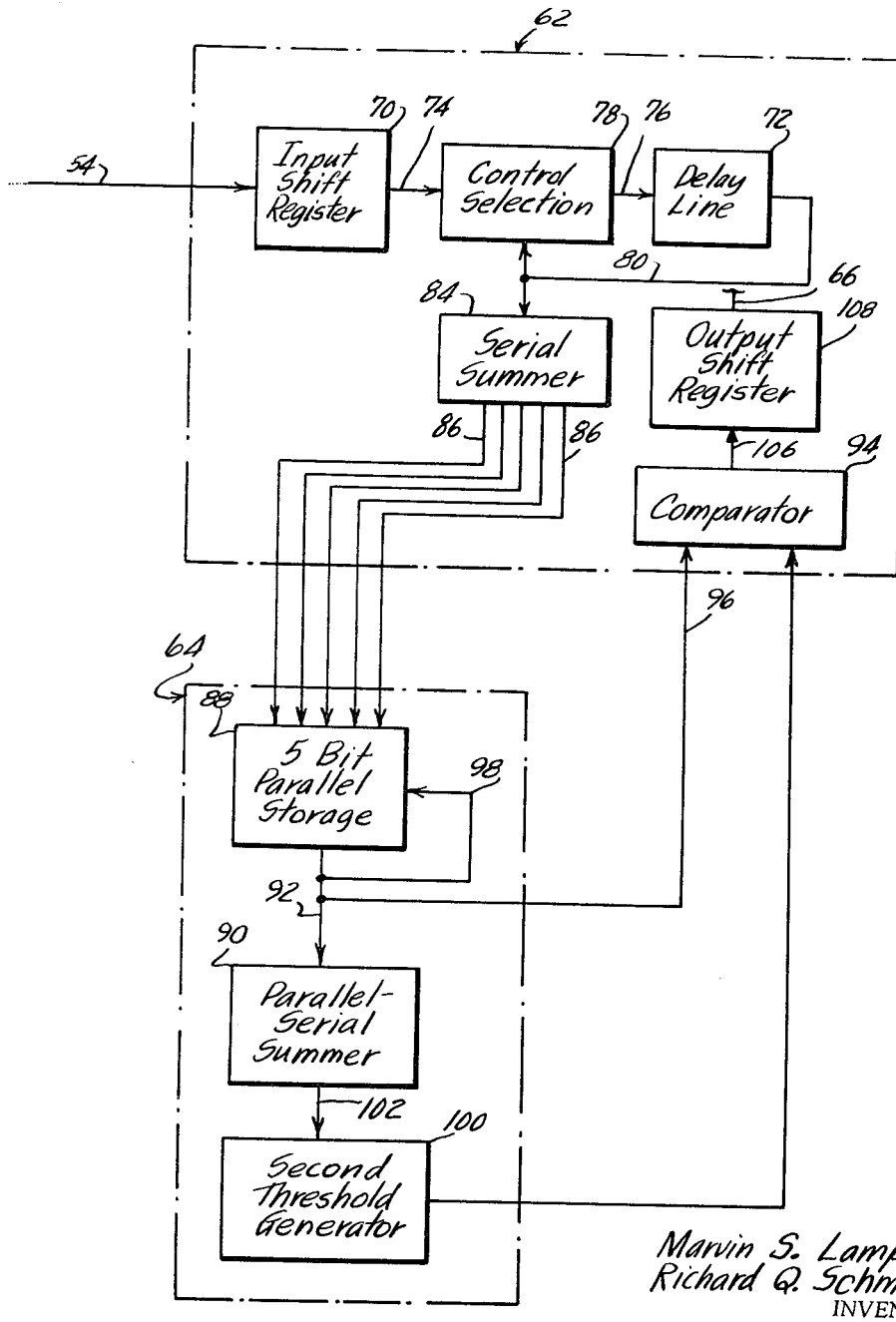

United States Patent Office 3,500,396
Patented Mar. 10, 1970

3,500,396
BACKGROUND AVERAGING SYSTEM FOR IMPROVING RADAR TARGET DETECTION
Marvin S. Lampert, Huntsville, Ala., and Richard Q. Schmidt, Huntington, N.Y., assignors, by mesne assignments, to the United States of America
Filed Dec. 23, 1968, Ser. No. 786,097
Int. Cl. G01s 9/02
U.S. Cl. 343—7          5 Claims

ABSTRACT OF THE DISCLOSURE

A threshold arrangment is disclosed that aids against contaminating radar signals, for example in an automatic digital range acquisition system, by placing equal weight on any signal which exceeds the threshold and by setting a second threshold whose level is dependent on background noise. Also, the system employs a memory arrangement allowing processing over many pulse repetition intervals so that false alarms due to clutter and jamming signals, and their effects, are greatly reduced in automatic target detection equipment.

BACKGROUND OF THE INVENTION

In a typical prior art system, the radar pulse transmitter generates a pulse of high power electromagnetic energy with or without phase coding. A duplexer safeguards sensitive receiver components while passing the high power pulse to the antenna. The antenna radiates the energy in the direction of targets and receives the reflected energy from the targets and clutter. The antenna may also receive other interfering signals. The interfering signals and reflected energy passes through the duplexer to the receiver, consisting of a mixer and I.F. amplifier. The mixer converts the R.F. signal to an intermediate frequency at which amplification can be easily accomplished.

The smallest detectable signals in the absence of clutter and other interference is the thermally generated noise present in the mixer. This noise, the target signal, clutter signal, and interfering signals are amplified by the I.F. amplifier to a level at which the relatively low frequency envelope variations of the I.F. carrier can be converted into a video wave form by the detector. This detected wave form is then compared to a threshold. All signals above the threshold are considered a logic ONE, those below the threshold are considered a logic ZERO. The video wave form is thus quantized into two mutually exclusive states. The number of ONES is held to a prescribed percentage of the total number of decision times, the decision times being roughly the reciprocal of the I.F. band width.

It is usually assumed that only the thermally generated noise is present in the radar dead time that occurs well after the longest range detectable signal should arrive. The automatic gain control is therefore usually restricted to average the ONES in the dead time to hold the thermally generated noise level constant at the output of the quantizer in the form of a constant level of ONES. The quantizer output is applied to an M of N detector.

With a constant level of ONES entering the M of N detector from thermally generated noise, the M of N detector can indicate the presence of a target (or clutter or interference) with a prescribed probability at a given signal to thermal noise ratio with a given false alarm rate established by its design. The false alarm rate caused by the clutter or intereference can not be established by design, however, and can render this detection system unusable.

SUMMARY OF THE INVENTION

With the foregoing in mind, it is a primary object of the invention to improve the probability of correct indication of a target in the presence of clutter and/or interference signals as part of background signals.

Another object of the invention is the provision of a radar system wherein R.F. signals are mixed to provide an I.F. wave form which is detected and digitally quantized to provide a predetermined output, e.g., a ONE, for each instance of a first threshold being exceeded in a clocking period, the ONES being applied to a detector or decoder which provides an output indicative of presence of a target whenever M or more than M ONES appear in any of N successive clocking periods, the system being characterized by the improvement comprising a background averaging means operative to vary the value of M between predetermined minimum and maximum values in accordance with the results of background averaging.

BRIEF DESCRIPTION OF THE DRAWINGS

The invention may be further said to reside in certain combinations and arrangements of parts by which the foregoing objects are achieved as will become apparent from the following detailed description when read in conjunction with the accompanying sheets of drawings forming a part of this specification, and in which:

FIG. 2 is a diagrammatic illustration in block form illustrating in greater detail the M of N detector and the background averager portions of the system of FIG. 1.

DESCRIPTION OF THE PREFERRED EMBODIMENT

Figure 1:
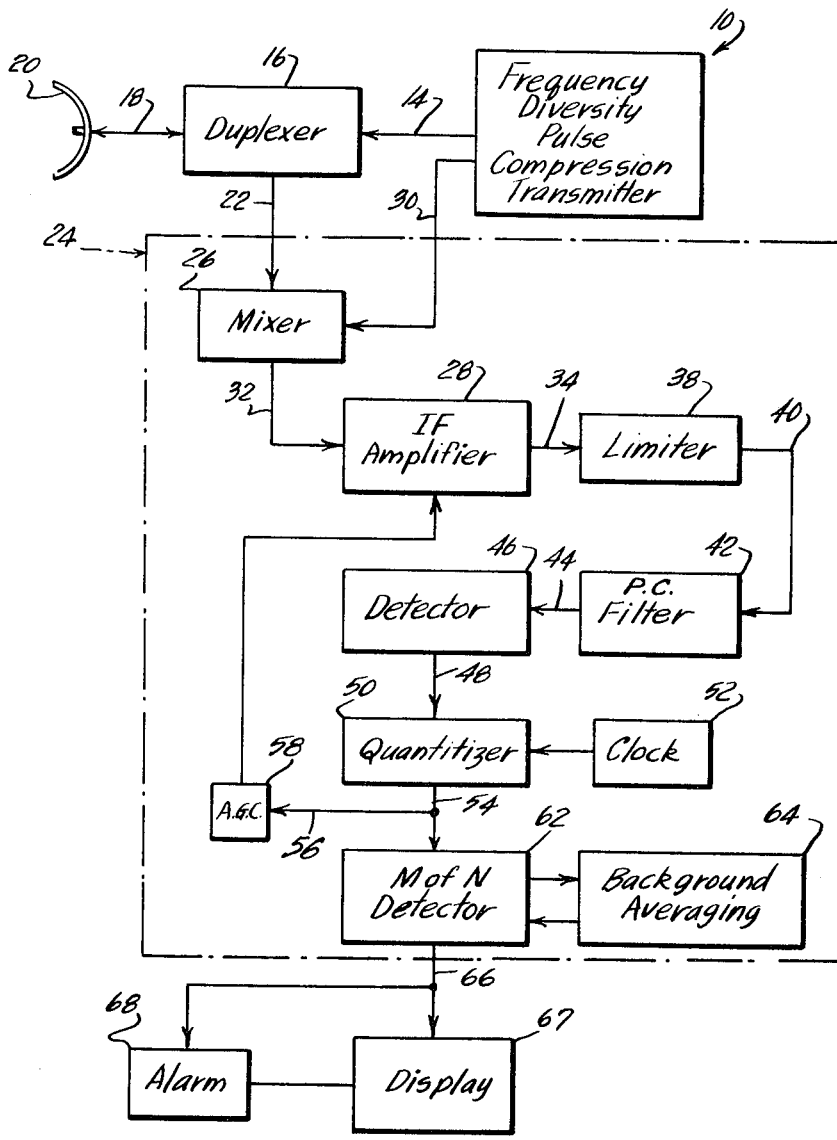
FIG. 1 is a diagrammatic illustration in block form of a radar system embodying the present invention.

The invention will be described with reference to use in a sophisticated radar system of the diverse frequency, pulse compression type, although background averaging according to the invention may be employed to advantage in other more or less sophisticated radar systems.

Referring to FIG. 1, a radar system 10 is illustrated comprising a frequency diversity, pulse compression transmitter 12 which generates pulses of high power electromagnetic energy which are conducted as shown by flow line 14 to a duplexer 16. The duplexer 16 which is connected by line 18 to an antenna 20 and by a line 22 to the receiver portion 24 of the system, passes the high power energy via line 18 to the antenna 20 for radiation while protecting the sensitive receiver portion 24 from the high power energy. The antenna 20 radiates the energy in the direction of targets and receives the reflected energy from the targets, as well as from clutter, as is well known. In addition, the antenna may receive other interfering R.F. signals such as from other radar emissions, counter measures, or the like.

The interfering signals and reflected energy are passed by the duplexer 16 to the receiver portion 24 comprising, among other things, a mixer 26 and an I.F. amplifier 28. Thus, R.F. energy from the duplexer 16 is passed via line 22 to the mixer 26 where it is converted to a lower, intermediate frequency at which amplification can be easily accomplished. The mixer conversion utilizes a local oscillator frequency supplied via line 30 and which is controlled to vary with the transmitted R.F. in a manner well known to those skilled in the art.

The I.F. representation of reflected signals, clutter signals, interference signals, and thermal noise, is passed as indicated by line 32 to the I.F. amplifier 28 for amplification and the output thereof is passed via line 34 to a limiter 38 which prevents the passage of signals amplified beyond a certain predetermined level. The purpose of this limiting is to reduce the dynamic range faced by the background averaging feature of the invention, which will later be described in greater detail, to a level which can be properly handled.

The limiter 38 output is applied via line 40 to a pulse compression filter 42 which removes from the reflected energy signals the frequency coding which had been applied to the transmitted pulses, thereby giving the desired range resolution when the I.F. carrier envelope is later converted to a video signal.

The pulse compression filter output on line 44 is applied to a detector 46 wherein the I.F. carrier envelope is converted to a video signal on line 48 which is further processed before display. Thus, the detected video signal is repeatedly compared, in a quantizer 50, to a predetermined threshold level and is considered a ONE if in excess of the threshold or a ZERO if below the threshold. The video signal is thereby quantized into two levels. In the system being described, the quantization decisions are clocked by clock means 52 at a frequency equal to the reciprocal of the I.F. band width to insure proper statistical samples. Clocking in the quantizer 50 also eliminates threshold errors that would occur if asynchronous quantized data were used by several paralleled circuits. The quantized data on lines 54, 56 is averaged in the radar dead time by an automatic gain control circuit 58 to adjust the gain of the I.F. amplifier 28 to a level that gives an optimum thermal noise percentage of ONES. The quantized data is applied via line 54 to an M of N detector 62 which declares a target present if M or more than M ONES occur in any of a predetermined number of successive clock periods. The value of M is determined by a background averager 64, and varies from a predetermined minimum to a predetermined maximum. The resulting output of processed video signals on line 66 may be utilized in a conventional display 67, or may be utilized to actuate an alarm 68 to indicate acquisition of a target.

FIG. 2 illustrates in detail the mechanization of the M of N detector 62 and the background averager 64. The incoming quantized video on line 54 is temporarily stored in an input shift register 70. Direct storage in a random access memory would work as well. The data then shifts into a delay line 72, as shown by flow lines 74, 76, via a control selection device 78 that places it in a particular order. The video, when quantized, is representative of signals corresponding to specific range increments. The delay line 72 stores a number of repetition periods of video information (32 periods for example). The control selection circuit 78 causes all 32 quantized video signal bits from one specific range, gathered in 32 successive repetition periods, to be stored as one contiguous group in the delay line 72. In one model, 64 range increments were used, for example, so the delay line 72 had to store $32 \times 64 = 2048$ bits. The delay line output on line 80 is recirculated back to its own input via the control selection circuit 78 to create a dynamic memory. The new data then writes over the oldest data continuously to update the information each repetition period.

A serial summer 84 receives the delay line output as indicated by line 80 and sums up the adjacent bits from a range interval, 31 of 32 being used in the present example. The sum is then transferred in parallel fashion, as shown by line 86, from the summer 84 to a 5-bit parallel storage register 88 instead of going directly to a comparator as in the ordinary M of N detector. The 5-bit storage register 88 consists of five shift registers that shift the sums of adjacent range increments to a parallel-serial summer 90 as indicated by line 92 and to a comparator 94 as indicated by line 96. As indicated by flow line 98, the sums also shift back to the parallel storage input when they reach the output in a manner similar to dynamic memory in order to retain the sums for reuse.

The sums represent the number of threshold crossings for adjacent range increments over the 32 stored repetition periods by the delay line 72. Averaging the sums would give a measure of the noise level at that time, whether originating thermally, from clutter, or from interference. This averaging is done by the parallel-serial summer 90. Assuming the average noise level measured to be derived from noise with a known distribution (Rayleigh in the model), a second threshold generator 100, which receives the output of the parallel-serial summer 90 as shown by line 102, merely selects a threshold M that will give the desired false alarm rate for the total count appearing at the parallel-serial summer output. This threshold M is applied via line 104 to the comparator 94. The next pass of the sum related to the central range increment is compared to this M by the comparator 94. The comparator ONES and ZEROS shift via line 106 into an output shift register 108, the ONES and ZEROS representing targets and no targets, respectively. During the following radar live time the output shift register 108 shifts out the stored data via line 66 at a real time rate to simulate video for a clean or relatively noise free display and the alarm circuit can automatically show the presence of a ONE if this is desired.

Obviously, many modifications and variations of the present invention are possible in the light of the above teachings.

What is claimed is:
1. A pulse radar system comprising:
a transmitter for generating high energy R.F. pulses;
a radiating and receiving antenna;
duplexer means for connecting said transmitter to said antenna;
receiver means connected to said duplexer for converting reflected target signals into video signals;
said receiver means comprising mixer means, I.F. amplifier means for amplifying I.F. signals including target signals, clutter signals, interference signals, and thermal noise, detector means for converting variations in the envelope of the amplified I.F. signals into a wave form of varying amplitude, clock means, quantizer means responsive to said clock means to provide quantized video output characterized by a first output condition for each of a series of timed periods wherein said wave form exceeds a predetermined threshold and a second output condition for each of said periods wherein the amplitude of said wave form is below said predetermined threshold, and M of N detector means for providing a video output target signal whenever M or more of said first output conditions occur within N decisions;

said system being characterized by the improvement comprising background averaging means connected to said M of N detector means and operative to vary the value of M in accordance with changes in the average of said first output conditons of said quantizer means;

said M of N detector means comprising first register means for receiving and storing said quantized video characterized by said first output conditon as a plurality of information bits;

control means for selecting, from said first register means, bits corresponding to predetermined range increments;

delay line means for storing selected bits;

summer means connected to receive and sum said selected bits from said delay line, said summer means having its output connected to said background averaging means;

comparator means connected to receive from said background averaging means signals representative of said valve of M and the sum of said selected bits, said comparator means being operative to produce output signals representative of a comparison of M with said sum; and second register means connected to the output of said comparator means for providing said video output target signals.

2. A pulse radar system as defined in claim 1, and wherein said background averaging means comprises:
   plural bit parallel storage means connected to receive the output of said summer means and operative to provide as an output the sum of said bits in digital form as a first input to said comparator means of said M of N detector means;
   parallel-serial summer means also connected to receive the output of said parallel storage means and operative to provide as an output the average of said sum of said bits; and
   a threshold generator means connected to receive the output of said parallel-serial summer means and responsive thereto to generate as an output signals representative of said value of M, said threshold generator means having its output connected as a second input to said comparator means of said M of N detector means.

3. A pulse radar system as defined in claim 2, and further characterized by:
   said first register means comprising shift register means.

4. A pulse radar system as defined in claim 3, and further characterized by:
   said second register means comprising shift register means.

5. A pulse radar system as defined in claim 4, and further characterized by:
   the first mentioned summer means comprising a serial summer.

References Cited

UNITED STATES PATENTS

| | | | |
|---|---|---|---|
| 3,214,754 | 10/1965 | Hildebrandt | 343—5 |
| 3,312,969 | 4/1967 | Halsted | 343—5 |
| 3,380,018 | 4/1968 | Littrell et al. | 343—7 X |

RODNEY D. BENNETT, JR., Primary Examiner

T. H. TUBBESING, Assistant Examiner